(12) United States Patent
Haupt et al.

(10) Patent No.: US 7,636,294 B2
(45) Date of Patent: Dec. 22, 2009

(54) CHANGER APPARATUS FOR INFORMATION DISCS

(75) Inventors: Martin Haupt, Vienna (AT); Franz Kletzl, Mank (AT); Robert Nemeth, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1959 days.

(21) Appl. No.: 09/090,035

(22) Filed: Jun. 10, 1998

(65) Prior Publication Data

US 2001/0043553 A1 Nov. 22, 2001

(30) Foreign Application Priority Data

Jun. 11, 1997 (DE) ................................. 197 24 542

(51) Int. Cl.
*G11B 17/04* (2006.01)
*G11B 17/08* (2006.01)

(52) U.S. Cl. .............................. 369/192.1; 369/178.01

(58) Field of Classification Search ................ 369/75.1, 369/75.2, 77.1, 77.2, 36, 192, 37.01, 36.01, 369/30.38, 30.48, 30.51, 30.52, 30.55, 30.56, 369/30.77, 30.78, 30.9, 30.6, 30.75
See application file for complete search history.

(56) References Cited

U.S. PATENT DOCUMENTS

| | | | | |
|---|---|---|---|---|
| 5,119,354 A | | 6/1992 | Umesaki | ...................... 369/36 |
| 5,508,994 A | * | 4/1996 | Nakamichi et al. | .......... 369/192 |
| 5,561,657 A | * | 10/1996 | Ogawa | ........................ 369/179 |
| 5,726,967 A | * | 3/1998 | Tanka et al. | .................. 369/192 |
| 5,862,109 A | * | 1/1999 | Nakamichi | .................... 369/36 |
| 5,864,532 A | * | 1/1999 | Nakamichi | .................. 369/178 |
| 5,970,041 A | * | 10/1999 | Inatani et al. | ................ 369/192 |

FOREIGN PATENT DOCUMENTS

| | | |
|---|---|---|
| EP | 0391424 A2 | 10/1990 |
| EP | 0743639 A2 | 11/1996 |
| EP | 0833324 A2 | 4/1998 |
| GB | 2296811 A | 7/1996 |
| JP | 06131793 * | 5/1994 |

* cited by examiner

*Primary Examiner*—Aaron Strange (57) ABSTRACT

The invention relates to a changer apparatus for information discs, comprising
  a stacking unit for stacking at least two information discs in at least two stacking positions,
  a read/write unit for reading information stored on the information discs and/or writing information on the information discs in a play position,
an eject position being provided in which an information disc can be removed from the apparatus,
In such a changer apparatus transport means have been provided for moving the information discs from the eject position into a loading position of the stacking unit along a curve-shaped loading path.

19 Claims, 13 Drawing Sheets

CHANGER APPARATUS FOR INFORMATION DISCS

BACKGROUND OF THE INVENTION

1. Field of the Invention

The invention relates to a changer apparatus for information discs, comprising
- a stacking unit for stacking at least two information discs in respective stacking positions,
- a read/write unit for reading information stored on the information discs and/or writing information on the information discs when they are in a play position, an eject position being provided in which an information disc can be inserted and removed from the apparatus.

2. Description of the Related Art

Such a changer apparatus is known from EP 743 639 A2. This known changer apparatus comprises a stacking unit which is movable in a vertical direction. By means of two longitudinal guides an information disc can be translated from the eject position into the play position and into the stacking unit. The play position is situated between the eject position and the stacking unit, the center of the information discs stacked in the stacking unit being situated outside the circumference of the information disc which is in the play position. Such a changer apparatus has an overall depth which is at least 1.5 times as large as the information disc diameter.

SUMMARY OF THE INVENTION

It is an object of the invention to provide a different changer apparatus which can be realized with a smaller overall depth.

According to the invention this object is achieved in that transport means are provided for transport of the information discs from an eject position into a loading position of the stacking unit along a curve-shaped loading path.

A curve-shaped loading path is to be understood to mean that the loading path extends non-orthogonally with respect to the front side of the changer apparatus and, consequently, that between the eject position and the loading position the information discs perform a lateral relative movement parallel to the front side of the changer apparatus. Thus, a curve-shaped loading path also includes a linear loading path which extends obliquely with respect to the front side of the changer apparatus.

For the transport of the information discs each individual information disc is brought into the eject position, for example by hand by a user. This single information disc is then moved into the loading position of the stacking unit along the curve-shaped loading path with the aid of the transport means. The loading position of the stacking unit is the position into which the individual information discs are moved for the time being after the transport from the eject position into the stacking positions of the stacking unit.

The curve-shaped loading path provides a greater design freedom for the construction as regards the arrangement of the individual components of the changer apparatus. This is particularly favorable for automotive uses because the mounting space then available, particularly in the case of mounting in the dashboard of a motor vehicle, is limited.

By means of the curve-shaped loading path it is possible to realize an apparatus depth smaller than 1.5 times the information disc diameter.

An advantageous embodiment of the invention is characterized in that the play position has been provided between the eject position and the loading position.

When the play position lies between the eject position and the loading position an information disc can be transferred directly from the eject position into the play position without prior transport into the stacking unit. As a result of this, the changer apparatus can also be used as a single-information-disc playing apparatus.

A further advantageous embodiment of the invention is characterized in that the play position is offset from the direct connecting line between the loading position and the eject position.

For a compact construction of the changer apparatus the appropriate arrangement of the play position is very important because usually the play position should be arranged in such a manner that the center of the stacking unit is situated outside the perimeter of the information disc in the play position.

Particularly in the case of changer apparatus having an essentially square base, a play position which is offset from a direct connecting line between the eject position and the loading position enables a better space utilization of the available mounting space. Frequently, for mounting in the dashboard of a motor vehicle only a mounting space of 1 DIN, i.e. having a width of 178 mm, a depth of 155 mm and a height of 50.5 mm, is available, which can be utilized in an optimum manner with the offset arrangement of the play position.

A further advantageous embodiment of the invention is characterized in that the play position is disposed on the loading path.

When the play position is situated on the loading path, the same transport means can be used for the transport of the information disc between the eject position and the loading position as well as for the transport between the eject position and the play position and the transport between the play position and the loading position. No additional transport mechanism is needed for the transfer from the loading path into the play position.

A further advantageous embodiment of the invention is characterized in that a first transport mechanism is provided for the transport of the information discs between the eject position, the play position and the loading position, and a second transport mechanism is provided for the transport of the information discs into the stacking positions of the stacking unit, the first transport mechanism being adapted to move the information discs in the loading plane and the second transport mechanism being adapted to move the information discs in a stacking direction oriented vertically with respect to the loading plane.

Such a changer apparatus having two transport mechanisms which operate perpendicularly to one another can be realized simply and at low cost.

A further advantageous embodiment of the invention is characterized in that the first transport mechanism comprises at least a first and a second guide for the disc edge of the information disc, which guide is grooved and is movable in the loading plane, the second guide comprising at least one rotationally drivable first transport wheel.

For transport of the information disc the disc edge engages the grooves in the first and the second guide. The movable arrangement of the first and the second guide permits these guides to move in accordance with the outline of the information disc and thus guide the disc edge of the information disc in a flexible manner. The first and the second guide contact the information disc only at its edge, the signal storage area of the information disc not being in contact with the guides. This precludes possible damage to the surface of the information disc. The rotationally drivable first transport wheel exerts a force on the disc edge oriented in the loading plane and thus rolls the information disc into the apparatus for loading and out of the apparatus for unloading.

A further advantageous embodiment of the invention is characterized in that the first guide is a passive supporting guide, there is provided a third guide comprising a second transport wheel, there is further provided a passive supporting guide as a fourth guide, the first, second, third and fourth guide each have pivotal arms which are supported at one end and which are pivotable in the loading plane, the first, second, third and fourth guide are each pre-loaded towards the curve-shaped loading path, the first transport wheel is essentially adapted to move the information discs between the eject position and a transfer position and the second transport wheel is essentially adapted to move the information discs from the transfer position into the loading position.

With such an arrangement the curve-shaped loading path can be realized simply and at low cost. In the eject position the information disc is held by the first and the second guide. The information disc is the rolled into the apparatus along the curve-shaped loading path by rotation of the first transport wheel of the second guide. The first and the second guide are then pivoted in accordance with the outline of the information disc and are urged against the disc edge as a result of the pre-load which is directed towards the loading path. Subsequently, the information disc is essentially guided by the first and the second guide. The first transport wheel serves for moving the information disc between the eject position and the transfer position. In the transfer position the first transport wheel transfers the drive function to the second transport wheel, and the information disc is moved from the transfer position into the loading position by the second transport wheel. The transport from the loading position into the eject position proceeds in the reverse sequence, i.e. initially the information disc is moved into the transfer position by, in principle, the second transport wheel and subsequently it is moved from the transfer position into the eject position by the first transport wheel. At the location of the transfer position, depending on the transport direction of the information disc, either the pivotal arm of the second guide is pivoted away from the disc edge by means of the first transport wheel and the pivotal arm of the third guide is pivoted towards the disc edge by means of the second transport wheel, as a result of which the groove of the first transport wheel is disengaged from the disc edge and the groove of the second transport wheel engages with the disc edge, or in the opposite transport direction the pivotal arm of the second guide is pivoted towards the disc edge and the pivotal arm of the third guide is pivoted away from the disc edge in a corresponding manner.

The fourth guide, which serves as a passive supporting guide, is preferably arranged in a rearward zone of the changer apparatus and takes over the function of the first passive supporting guide in the course of the loading operation. The fourth guide can be arranged on the chassis plate or, alternatively, on the read unit. In a transitional phase both the first passive supporting guide and the fourth passive supporting guide engage with the disc edge of the information disc.

A further advantageous embodiment of the invention is characterized in that the first and the third guide are mounted on a common pivot.

Such a mounting on a common pivot enables the first and the second transport wheel to be driven by a single motor via an intermediate wheel which is rotatably mounted on the common pivot.

A further advantageous embodiment of the invention is characterized in that the read/write unit comprises a base plate and a laser mounting plate, the base plate and the laser mounting plate are coupled by means of dampers, the base plate is slidably mounted on the chassis plate, and the laser mounting plate carries a clamping device for clamping the information disc in the play position and an optical unit for reading information stored on the information disc.

Such a construction provides a proper isolation between the read/write unit and the chassis plate, so as to isolate the read/write unit from external vibrations and shocks.

This is particularly important when the CD changer apparatus is used in a motor vehicle.

BRIEF DESCRIPTION OF THE DRAWINGS

A diagrammatically represented embodiment of the invention will be described hereinafter, by way of example, with reference to FIGS. 1 to 13 of the drawings. In the drawings.

DESCRIPTION OF THE PREFERRED EMBODIMENTS

Figure 1:
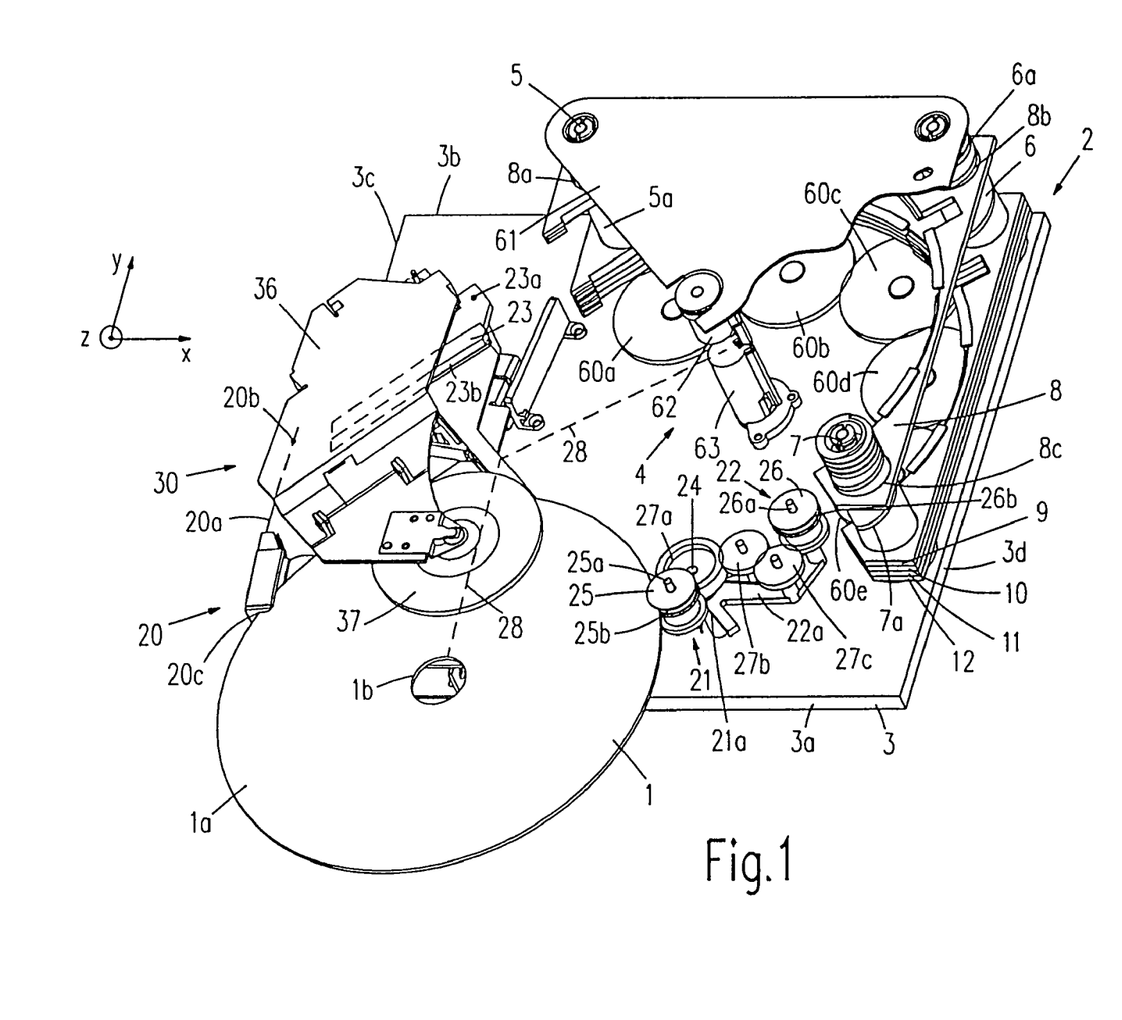
FIG. 1 is a perspective view of a changer apparatus for information discs with an information disc in an eject position, in which it can be removed from the apparatus by hand by a user. The apparatus includes a read unit for reading information stored on the information disc, a stacking unit for stacking at least two information discs, and a first, second, third and fourth guides for transport of the information disc from the eject position into a play position and then into a loading position.

FIG. 1 is a perspective view of a changer apparatus for information discs with an information disc 1 in an eject position, in which it can be removed from the apparatus by hand by a user and in which it can be inserted into the apparatus by hand by the user for the purpose of loading. The information disc 1 has a circular disc edge 1a and a center hole 1b. The changer apparatus is accommodated in a housing 2, which is shown only partly and which has a base formed by a chassis plate 3. The chassis plate 3 has a front edge 3a, a rear edge 3b, a left-hand side edge 3c and a right-hand side edge 3d. The chassis plate 3 extends in an x-y plane, the x direction being defined as the direction from left to right in the same direction as the front edge 3a and the y direction being defined as a direction which extends in the same direction as the left-hand side edge 3c. A direction perpendicular to the x-y plane is defined as the z direction. As is shown in the perspective view of FIG. 1 a stacking unit 4 is arranged in the right-hand rear area of the housing 2, which unit comprises a first threaded spindle 5, a second threaded spindle 6 and a third threaded spindle 7, which extend vertically with respect to the chassis plate 3 in the z direction. The first threaded spindle 5 has an external screwthread 5a, the second threaded spindle 6 has an external screwthread 6a and the third threaded spindle 7 has a external screwthread 7a. There is a first holder compartment 8, a second holder compartment 9, a third holder compartment 10, a fourth holder compartment 11 and a fifth holder compartment 12, which are arranged one above the other in the z direction and which serve for holding one information disc each. The first holder compartment 8 has a first opening 8a, in which the external screwthread 5a of the first threaded spindle 5 engages, a second opening 8b, in which the external screwthread 6a of the second threaded spindle 6 engages, and a third opening 8c, in which the external screwthread 7a of the third threaded spindle 7 engages. Likewise, the second holder compartment 9, the third holder compartment 10, the fourth holder compartment 11 and the fifth holder compartment 12 each have three openings, not shown, in which the external screwthreads of the first threaded spindle 5, the second threaded spindle 6 and the third threaded spindle 7 engage. By means of a gear train 60 comprising the gear wheels 60a, 60b, 60c, 60d and 60e the first threaded spindle 5, the second threaded spindle 6 and the third threaded spindle 7 can be driven by a drive mechanism, not shown. Alternatively, driving by means of a toothed belt is possible. The holder compartments 8, 9, 10, 11 and 12 are movable in the vertical z direction by rotation of the threaded spindles 5, 6 and 7. In the center of the stacking unit 4 an upper cover plate 61 carries an upper guide pin 62 and the chassis plate 3 carries a lower guide pin 63. The upper guide pin 62 and the lower guide pin 63 can be moved in the z direction by means of a drive mechanism, not shown.

The operation of the stacking unit 4 will be explained hereinafter with reference to FIG. 2, which is a front view of the changer apparatus in the eject position as shown in FIG. 1. The third threaded spindle 7 and, likewise, the first threaded spindle 5 as well as the second threaded spindle 6, which is not visible in FIG. 2, have an upper stacking zone 13, a lower stacking zone 14 and a central stacking zone 15 between the upper stacking zone 13 and the lower stacking zone 14. The central zone 15 has a vertical loading position 16, which is spaced from the upper stacking zone 13 by an upper spacing zone 17 and which is spaced from the lower stacking zone 14 by a lower spacing zone 18. The external screwthread 7a of then third threaded spindle 7 and, likewise, the external screwthreads 6a and 5a of the second threaded spindle 6 and the first threaded spindle 5, respectively, have a pitch which is zero over an angle of rotation of 45°. In the upper spacing zone 17 and the lower spacing zone 18 the threaded spindles 5, 6 and 7 each have a pitch which is basically defined by the vertical height in the z direction of the holder compartments 8, 9, 10, 11 and 12. The pitch of the threaded spindles 5, 6 and 7 in the upper spacing zone 17 and in the lower spacing zone 18 is substantially greater than the pitch in the loading position 16 and the pitch in the upper stacking zone 13 and the lower stacking zone 14. In the representation shown in FIG. 2 the first holder compartment 8 is in the loading position and the other holder compartments 9, 10, 11 and 12 are in the lower stacking zone 14. The lower stacking zone 14 has a first stacking position 14a, a second stacking position 14b, a third stacking position 14c and a fourth stacking position 14d. The upper stacking zone 13 has a first stacking position 13a, a second stacking position 13b, a third stacking position 13c and a fourth stacking position 13d. In the representation shown in FIG. 2 the second holder compartment 9 is in the first stacking position 14a of the lower stacking zone 14, the third holder compartment 10 is in the second stacking position 14b, the fourth holder compartment 11 is in the third stacking position 14c, and the fifth holder compartment 12 is in the fourth stacking position 14d. If starting from the situation represented in FIG. 2 the threaded spindles 5, 6 and 7 are rotated, the first holder compartment 8, which is in the loading position 16, moves into the fourth stacking position 13d of the upper stacking zone 13, the second holder compartment 9 moves into the loading position 16, the third holder compartment 10 moves into the first stacking position 14a, the fourth holder compartment 11 moves into the second stacking position 14b and the fifth holder compartment 12 moves into the third stacking position 14c of the lower stacking zone 14. Likewise, the third holder compartment 10, the fourth holder compartment 11 and the fifth holder compartment 12 can be moved into the stacking position 16 one after the other. Thus, by rotation of the threaded spindles 5, 6 and 7 each of the holder compartments 9, 10, 11 and 12 situated in the lower stacking zone 14 can be moved into loading position 16 one after the other and by further rotation the holder compartment 9, 10 and 11 can be moved into the upper stacking zone 13. During the vertical travel of the holder compartments 8, 9, 10, 11 and 12 the information discs in these holder compartments are moved in the z direction by means of the upper guide pin 62 and the lower guide pin 63 in that the upper guide pin 62 and the lower guide pin 63 engage the center holes 1b of the information discs 1.

Hereinafter, the changer apparatus is described further with reference to FIG. 1. For the transport of the information disc 1 from the eject position shown in FIG. 1 into the first holder compartment 8, which is in its loading position 16 as shown in FIG. 2, a first guide 20, a second guide 21, a third guide 22 and a fourth guide 23 have been provided. The first guide 20 is constructed as a passive supporting guide and by means of a pivotal arm 20a it is mounted so as to be pivotable about a pivot 20b on the left-hand side of the chassis plate 3. The first guide 20 has a V-shaped groove 20c for guiding the disc edge 1a of the information disc 1. The second guide 21 is arranged at the opposite side on the right-hand side of the housing 2 and comprises a first transport wheel 25, which is supported on a pivotal arm 21a so as to be rotatable about a spindle 25a. The pivotal arm 21a is mounted on the chassis plate 3 so as to be pivotable about a pivot 24. For the transport of the information disc 1 the first transport wheel 25 has a V-shaped groove 25b adapted to engage with the disc edge 1a of the information disc 1. The third guide 22 comprises a second transport wheel 26 which is supported on a pivotal arm 22a so as to be rotatable about a spindle 26a. The pivotal arm 22a is supported on the chassis plate 1 on the same pivot 24 which carries the pivotal arm 21a of the second guide 21. The second transport wheel 26 also has a V-shaped groove 26b. The first transport wheel 25 and the second transport wheel 26 are rotationally drivable by means of a intermediate drive 27 comprising three intermediate wheels 27a, 27b and 27c. The intermediate wheel 27a is rotatable about the spindle 24 and is driven by a motor, not shown, via a drive chain, not shown. The intermediate wheels 27b and 27c are rotatably supported on the pivotal arm 22a.

The first guide 20, the second guide 21, the third guide 22 and the fourth guide 23 are each pre-loaded towards a curve-shaped loading path 28 by means of a spring, not shown.

In the eject position of the information disc 1, which position is shown in FIG. 1, the first guide 20 and the first transport wheel 25 are urged against the disc edge 1a of the information disc 1 with the groove 20c and with the groove 25b, respectively, under the influence of the spring-loads of the pivotal arms 20a and 21a. The second transport wheel 26 of the third guide 22 is pressed away from the stacking unit 4 against the spring load, so that by rotation of the threaded spindles 5, 6 and 7 any one of the holder compartments 8, 9, 10, 11 and 12 can be moved into the loading position 16. The transport wheel 26 is then pivoted away so far that any information discs present in the holder compartments 8, 9, 10, 11 and 12 are not touched by the second transport wheel 26.

A read unit 30 is arranged so as to be movable on the chassis plate 3 in the front-left area of the changer apparatus.

The read unit 30 carries the fourth guide 23 which is constructed as a passive supporting guide and is mounted on the read unit 30 so as to be pivotable about a pivot 23a. The fourth guide 23 has a V-shaped groove 23b for guiding the disc edge 1a of the information disc 1.

Figure 3:
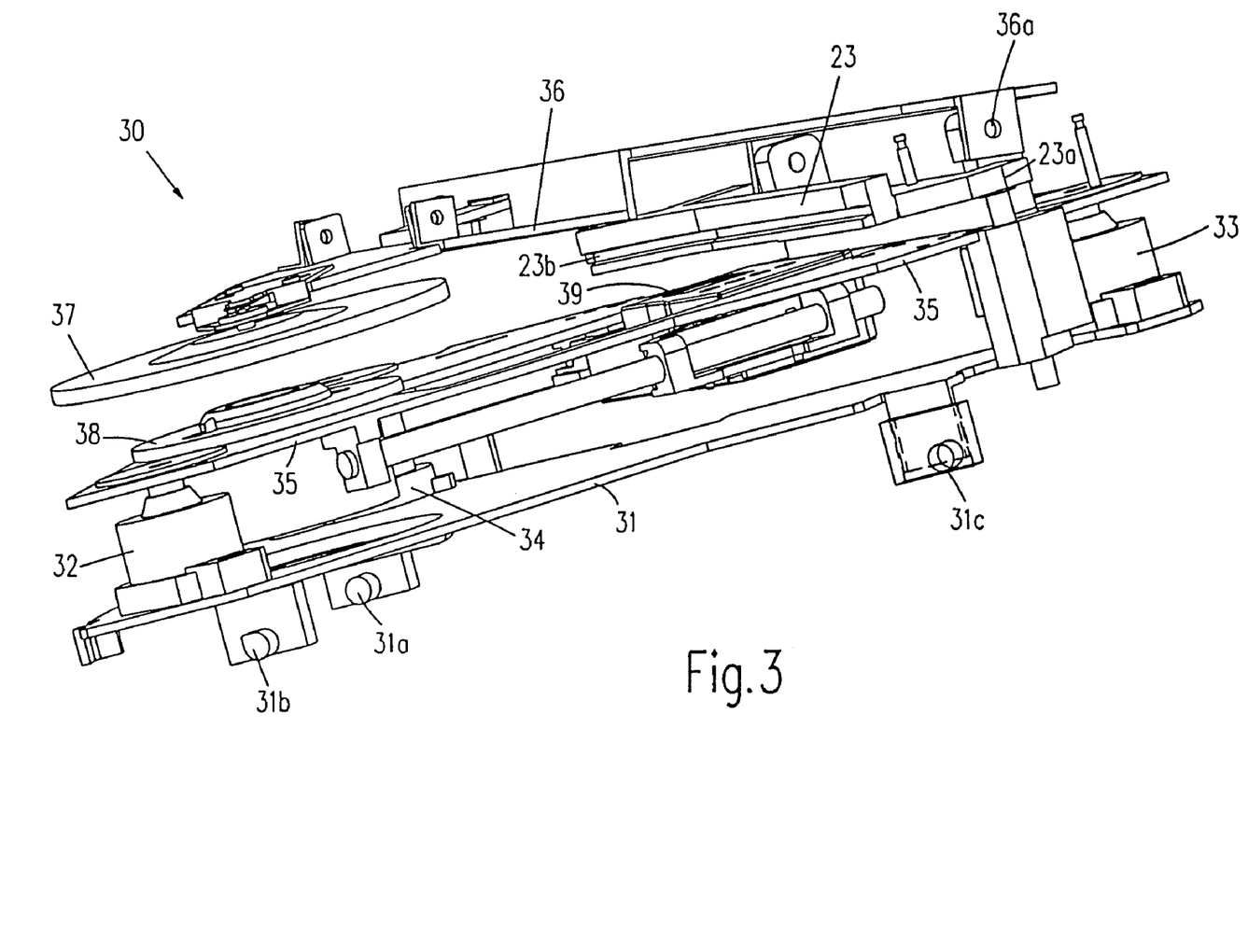
FIG. 3 is a perspective view of the read unit.

The construction of the read unit 30 will be described in more detail hereinafter with reference to FIG. 3. FIG. 3 is a perspective view of the read unit 30. The read unit 30 has a base plate 31 comprising a first guide pin 31a, a second guide pin 31b and a third guide pin 31c. The base plate 31 is coupled to a laser mounting plate 35 by means of a first damper 32, a second damper 33 and a third damper 34. A clamping arm 36 with a clamping disc 37 is mounted on the laser mounting plate 35 so as to be rotatable about a clamping spindle 36a. The laser mounting plate 35 supports a driving disc 38 which is rotationally drivable by means of a motor, not shown. Furthermore, an optical unit formed by a laser unit 39 is supported on the laser mounting plate 35 so as to be movable. The base plate 31 of the read unit 30 is mounted on the chassis plate 3 so as to be slidable.

Figure 4:
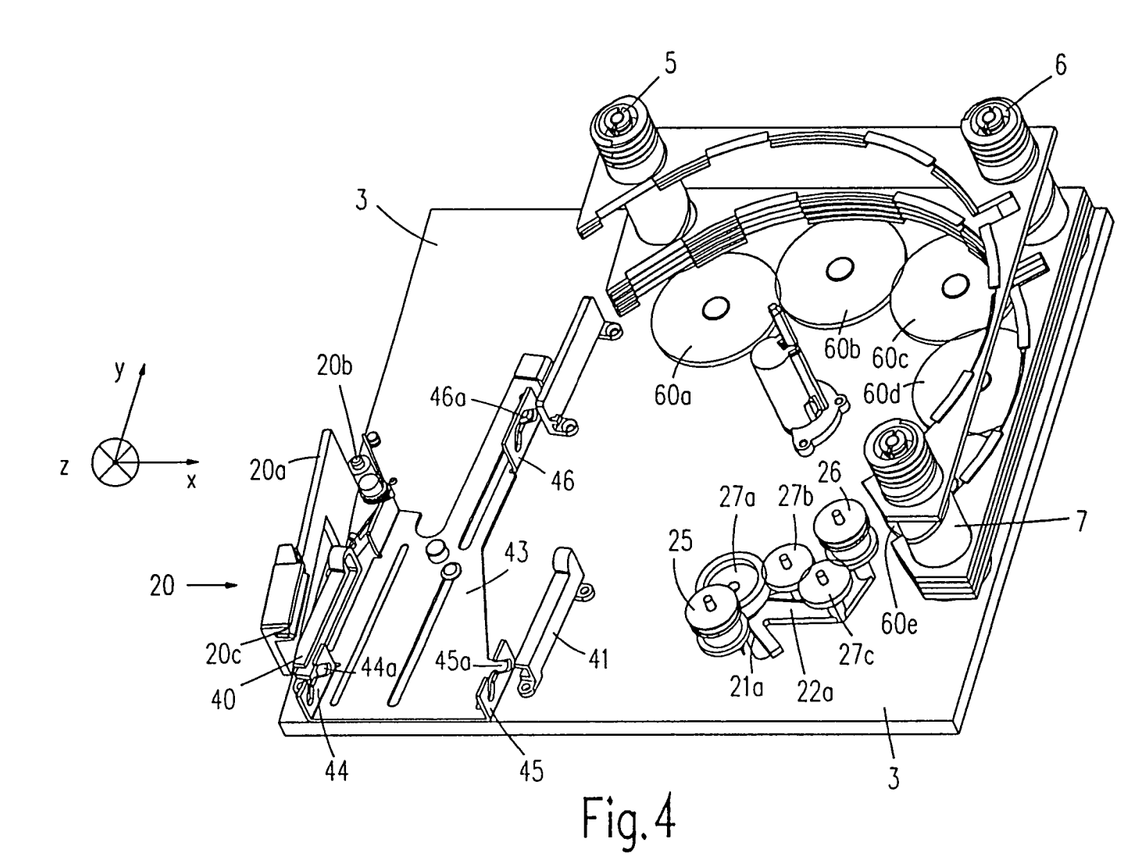
FIG. 4 is a perspective view of parts of the changer apparatus with a sliding plate for translating the read unit, not shown, and for controlling the pivotal movement of the first, the second, the third and the fourth guide as well as for controlling guide pins of the stacking unit and a clamping arm of the read unit, FIG. 5. is a side view of the changer apparatus in the eject position as shown in FIG. 2.

To illustrate this slidable mounting of the base plate 31 on the chassis plate 3 FIG. 4 shows a perspective view of parts of the changer apparatus, the read unit 30, the base plate 31 as well as the information disc 1 not being shown for the sake of clarity.

To guide the read unit 30, as shown in FIG. 4, the chassis plate 3 carries a first guideway 40 and a second guideway 41. The first guideway 40 serves for guiding the first guide pin 31a of the base plate 31 and the second guideway 41 serves for guiding the second guide pin 31b. A sliding plate 43 is movable in the y direction by a drive mechanism, not shown. This sliding plate 43 comprises a first slider 44 having a V-shaped sliding slot 44a, a second slider 45 having a V-shaped sliding slot 45a, and a third slider 46 having a V-shaped sliding slot 46a. The V-shaped sliding slot 44a serves for guiding the first guide pin 31a of the base plate 31, the V-shaped sliding slot 45a serves for guiding the second guide pin 31b of the base plate 31, and the V-shaped sliding slot 46a serves for guiding the third guide pin 31c of the base plate 31.

Figure 5:
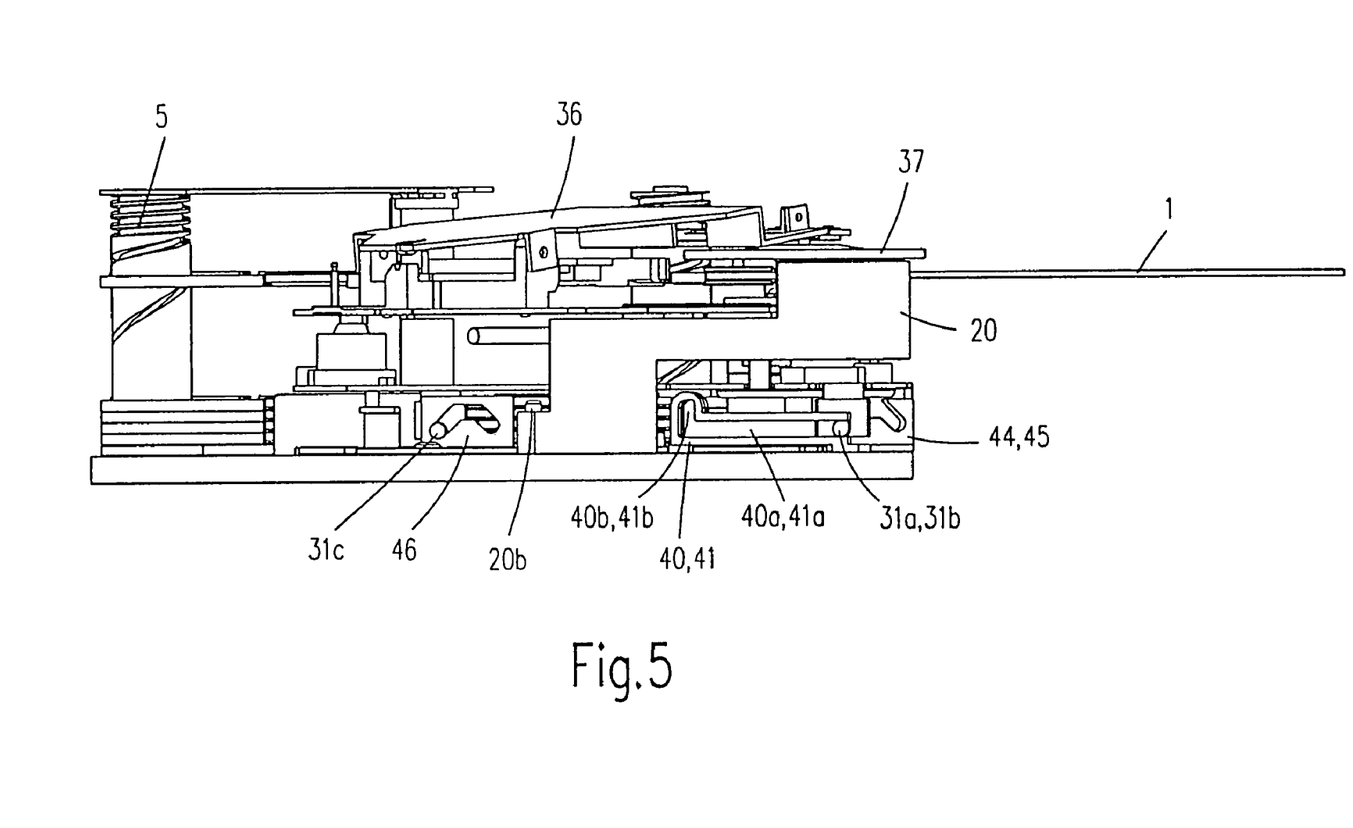
Figure 6:
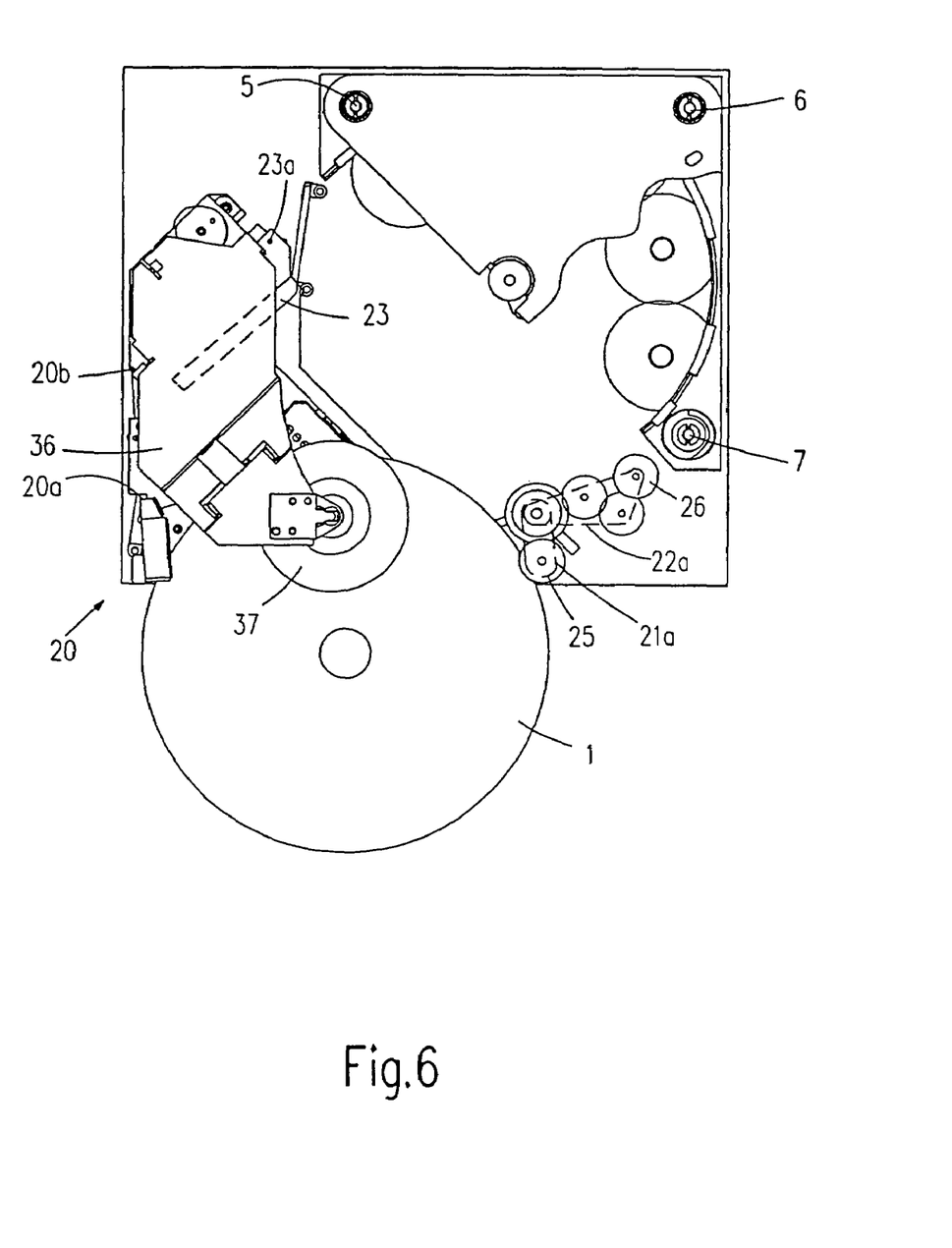
FIG. 6 is a plan view of the changer apparatus in the eject position as shown in FIG. 1.

FIG. 5 is a side view in the x direction showing the changer apparatus in the eject position of FIG. 1. As is apparent from FIG. 1 the first guideway 40 and the second guideway 41 are L-shaped and thus comprise horizontal guideway sections 40a and 41a and vertical guideway sections 40b and 41b.

FIG. 5 shows the clamping arm 36 with the clamping disc 37 in the open position, i.e. the clamping disc 37 does not bear on the driving disc 38.

For the transport of the information disc 1 into the stacking unit 4 or into a play position, starting from the eject position shown in FIG. 1, the first transport wheel 25 is rotated by a drive unit, not shown, by means of the intermediate wheel 27a, as a result of which the information disc 1, supported by the first guide 20, is rolled onto the curve-shaped loading path 28 into the apparatus.

At the same time, the sliding plate 43 shown in FIG. 5 and, consequently, the read unit 30 is moved into the apparatus in the y direction. The first guide pin 31a of the read unit 30 is then guided in the first guideway 40 and the second guide pin 31b is guided in the second guideway 41. The first slider 44, the second slider 45 and the third slider 46 then exert the driving force in the y direction on the first guide pin 31a, the second guide pin 31b and the third guide pin 31c of the base plate 31.

Figure 7:
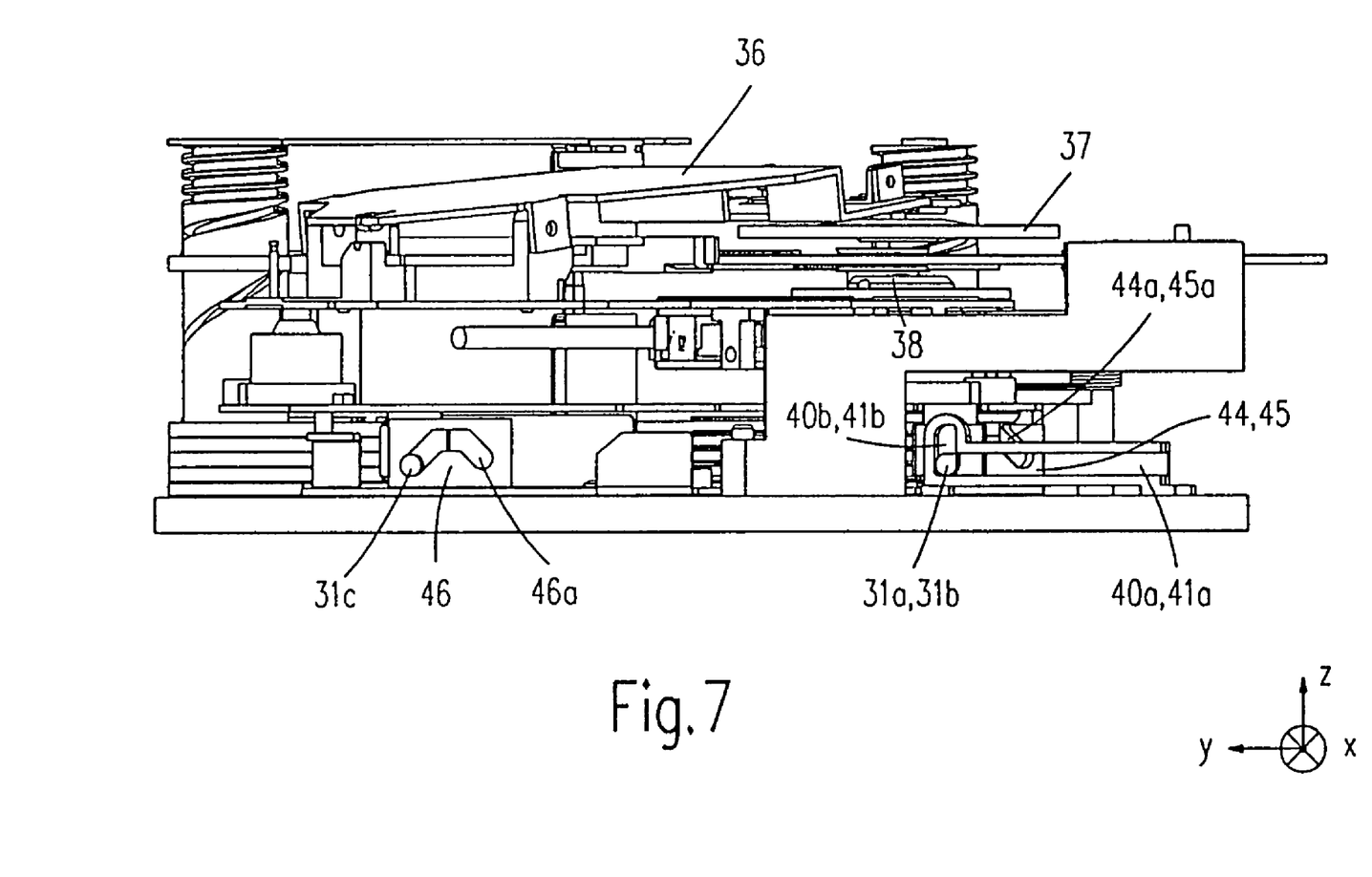
FIG. 7 is a side view of the changer apparatus in a first intermediate position, in which the information disc is freely interposed between a clamping disc and a driving disc, from which first intermediate position the information disc is movable into the play position and into the loading position.

FIG. 7 is a side view of the changer apparatus in a first intermediate position. In this first intermediate position the first guide pin 31a and the second guide pin 31b of the base plate 31 are disposed at the rearward end of the horizontal guideway section 40a of the first guideway 40 and the horizontal guideway section 41a of the second guideway 41, respectively, which extend in the y direction. Upon a further movement of the sliding plate 43 in the y direction the first guide pin 31a, the second guide pin 31b and the third guide pin 31c are urged upward in the z direction in the V-shaped slots 44a, 45a and 46a of the first slider 44, the second slider 45 and the third slider 46, respectively, as a result of which a second intermediate position is reached. The first guide pin 31a and the second guide pin 31b then move upward in the vertical guideway sections 40b and 41b.

Figure 8:
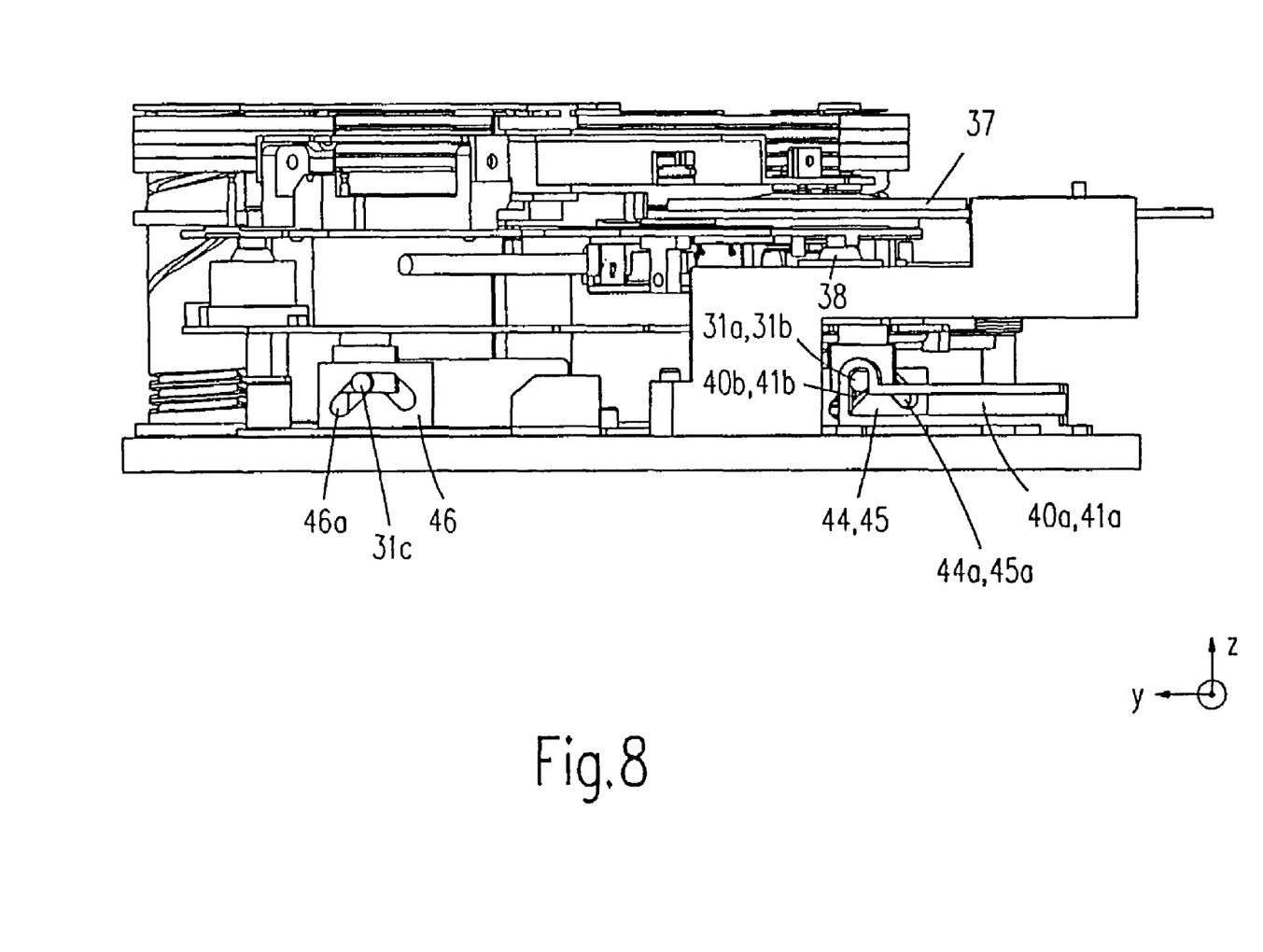
FIG. 8 is a side view of the changer apparatus in a second intermediate position, in which the information disc is clamped between the clamping disc and the driving disc of the read unit.

The second intermediate position is shown in side view in FIG. 8. FIG. 8 shows that the first guide pin 31a and the second guide pin 31b are situated at the respective upper ends of the vertical guideway sections 40b and 41b. This results in the read unit 30 being lifted, thereby causing the clamping disc 37 to be pressed onto the driving disc 38, in a manner not shown, and the information disc 1 being clamped between the clamping disc 37 and the driving disc 38.

Figure 9:
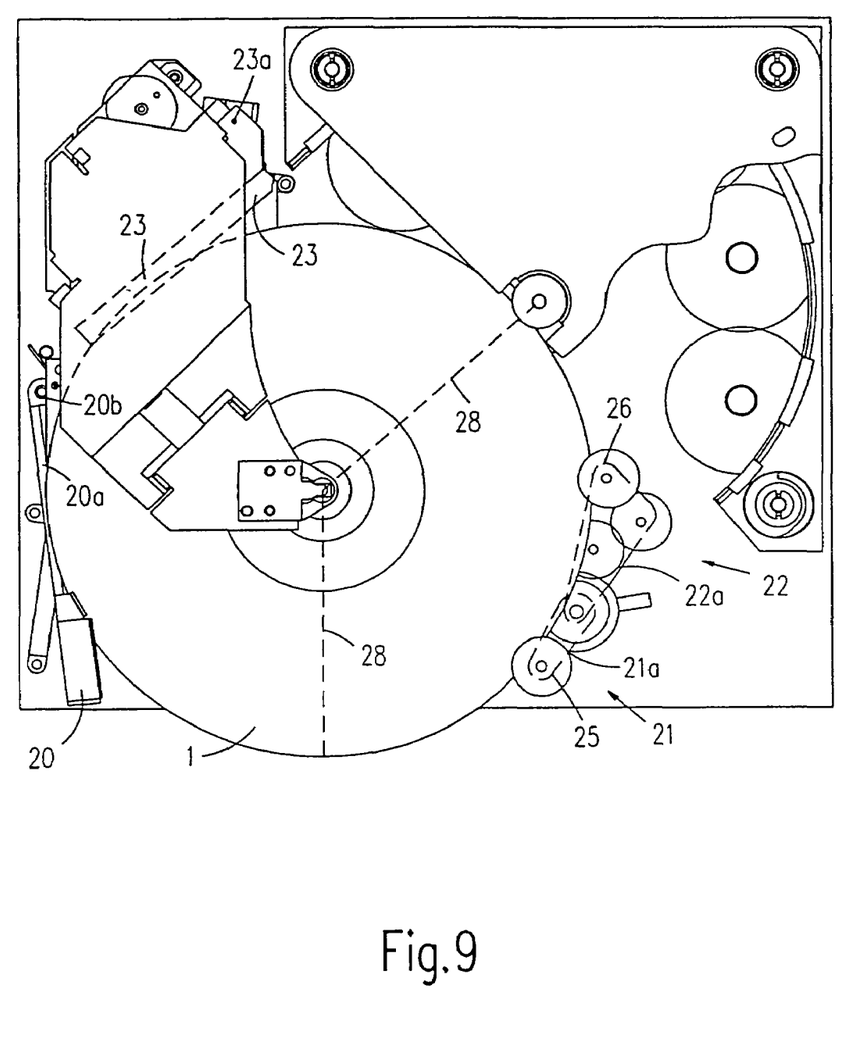
FIG. 9 is a plan view of the changer apparatus in the first intermediate position, the information disc being held by the first, the second, the third and the fourth guide.

The first intermediate position of FIG. 7 is shown in plan view in FIG. 9. From FIG. 9 it is apparent that in the first intermediate position the information disc 1 is held by the first guide 20, the second guide 21 with the first transport wheel 25, the third guide 22 with the transport wheel 26 as well as the fourth guide 23. The first guide 20, the second guide 21, the third guide 22 and the fourth guide 23 are urged against the disc edge 1a of the information disc 1 under the spring loads of their pivotal arms and hold the information disc 1 in the first intermediate position.

Figure 10:
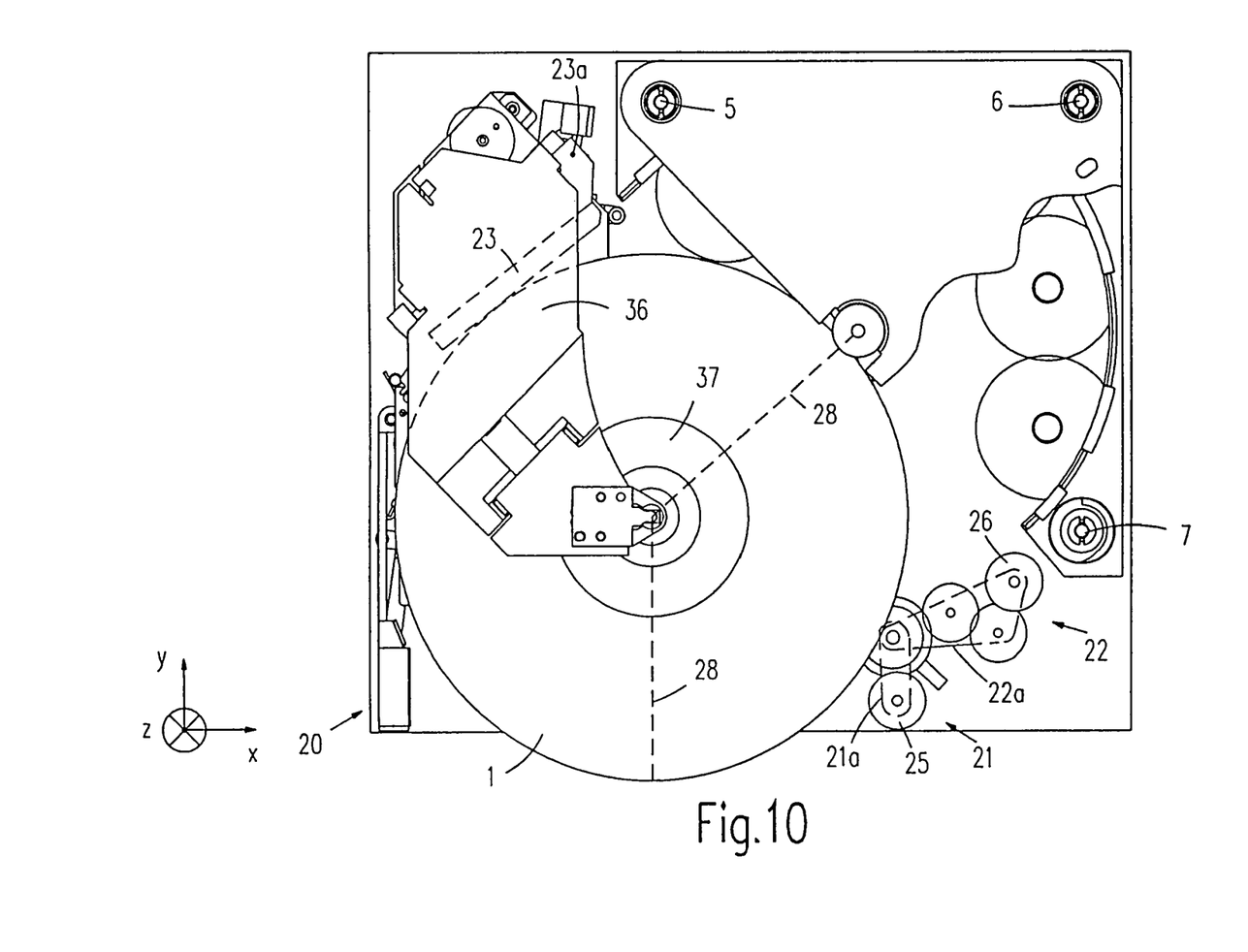
FIG. 10 is a plan view of the changer apparatus in a play position, the first, the second, the third and the fourth guide being in positions pivoted away from the disc edge of the information disc, the information disc being clamped between the driving disc and the clamping disc of the read unit, and the information stored on the information disc being readable by means of the read unit.

FIG. 10 is a plan view which shows the changer apparatus with the information disc 1 in a play position. In this play position the first guide 20, the second guide 21 with the first transport wheel 26, the third guide 22 with the second transport wheel 26, and the fourth guide 23 are pivoted away from the information disc 1, as a result of which the V-shaped grooves of these guides no longer act upon the disc edge of the information disc 1. The pivoting away of the first guide 20, the second guide 21, the third guide 22 and the fourth guide 23 is controlled by the movement of the sliding plate 43, which performs a movement in the y direction between the second intermediate position and the play position. During this movement between the second intermediate position and the play position the sliding plate 43 urges the first guide 20, the second guide 21, the third guide 22 and the fourth guide 23 away from the information disc 1 against the pre-loading forces.

In the play position shown in FIG. 10 the information disc 1 is held exclusively by the clamping disc 37 and the driving disc 38. In the play position the information disc 1 is rotated as a result of the rotation of the driving disc 38, and the information stored on the information disc 1 can be read by means of the read unit 30. In the play position the laser mounting plate 35 is only coupled to the base plate 31 and, consequently, to the chassis plate 3 via the dampers 32, 33 and 34. Thus, the laser mounting plate 35 is isolated from external vibrations and shocks of the housing 2 and the chassis plate 3 by means of the dampers 32, 33 and 34, as a result of which the read unit 30 can read or play back the information stored on the information disc 1 without being affected by external vibrations.

Figure 11:
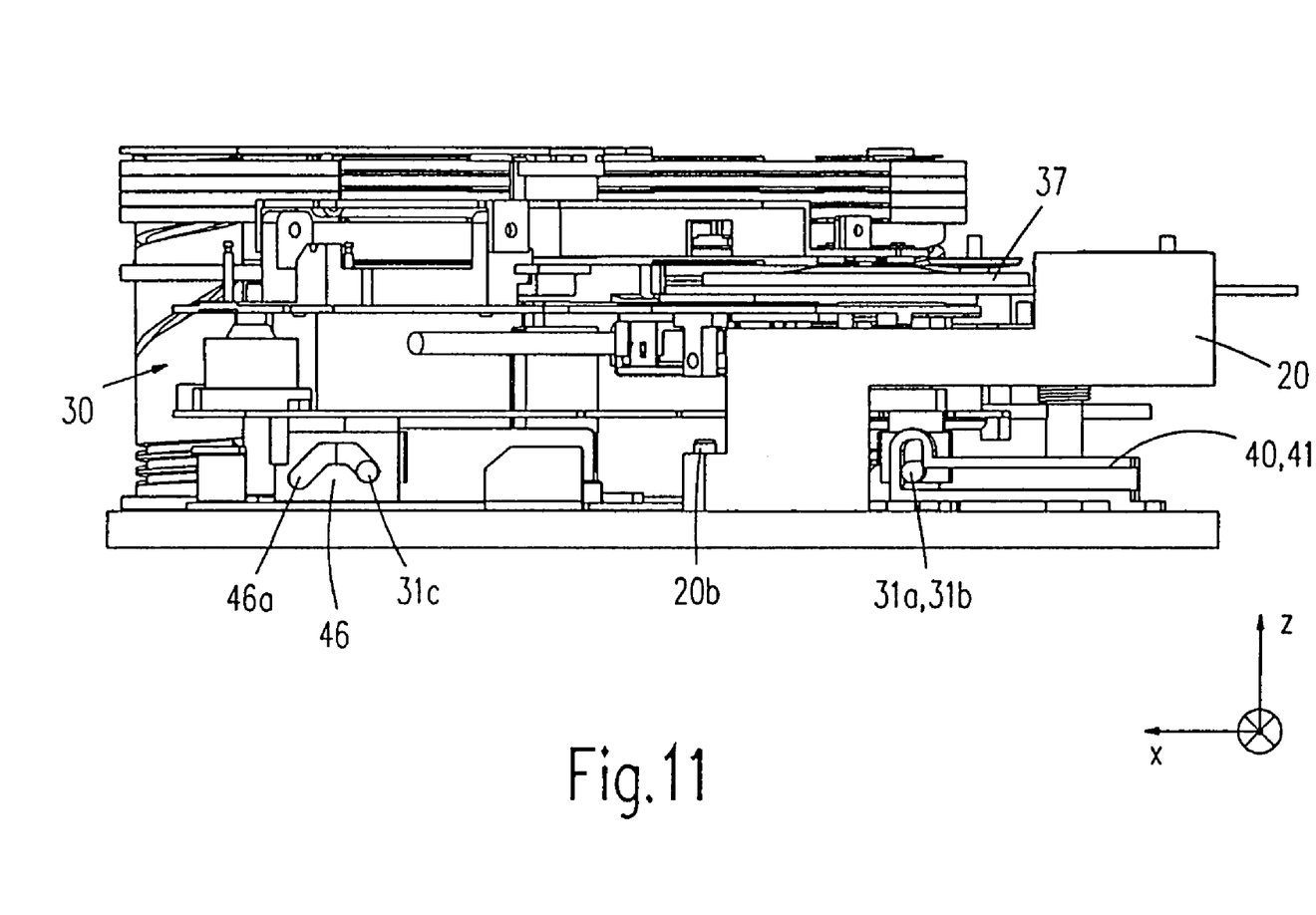
FIG. 11 is a side view of the changer apparatus in the play position.

FIG. 11 is a side view which shows the changer apparatus in the play position. In comparison with the second intermediate position shown in FIG. 8 the sliding plate 43 has been moved in the y direction, so that the first guide pin 31a, the second guide pin 31b and the third guide pin 31c have been urged downward in the V-shaped sliding slots 44a, 45a and 46a. As a result of this, the read unit 30 has also been lowered with respect to the second intermediate position.

From the first intermediate position shown in FIGS. 7 and 9 the information disc 1 it is possible to move the information disc 1 into the play position shown in FIGS. 10 and 11 and also to move the information disc 1 into the stacking unit 4.

For the transport into the stacking unit 34 from the first intermediate position shown in FIG. 9 the information disc 1 is rolled onto the curve-shaped loading path 28 into the stacking unit 4. Essentially, driving is effected by the second transport wheel 26, which takes over the driving function from the first transport wheel 25. The supporting function is essentially provided by the fourth guide 23.

Figure 2:
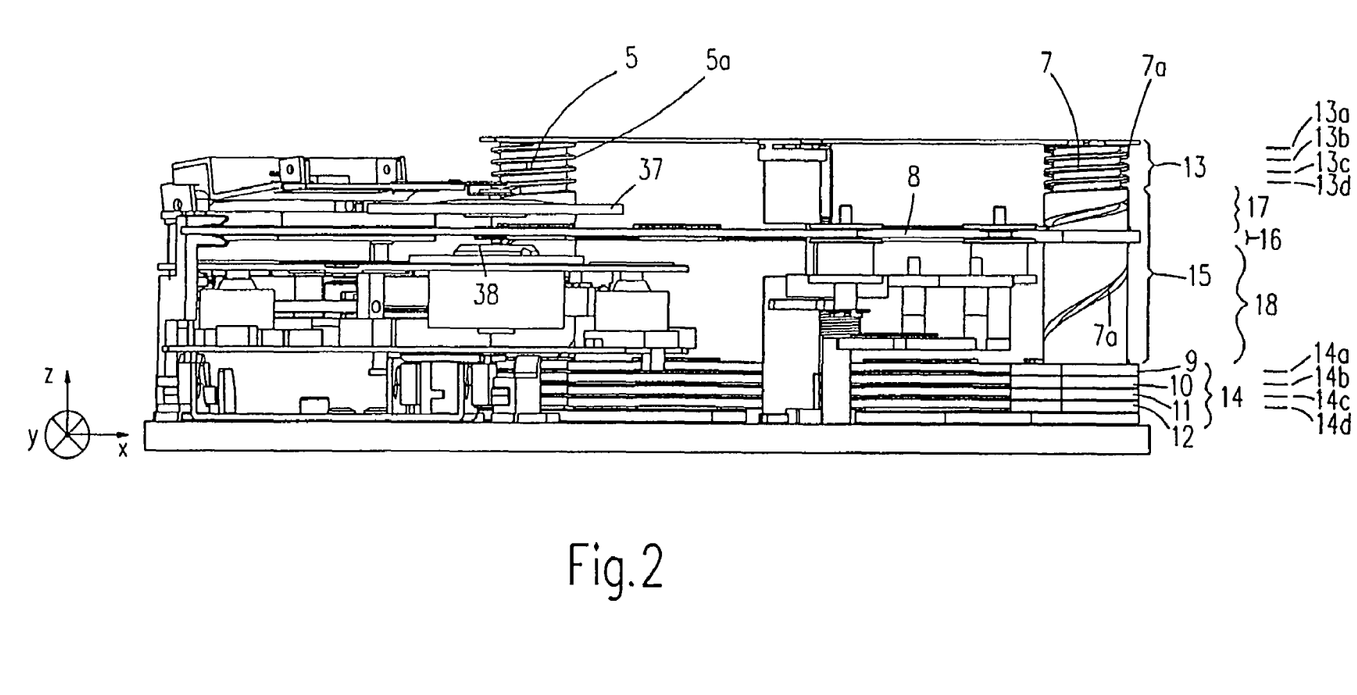
FIG. 2 is a front view of the changer apparatus in the eject position as shown in FIG. 1.
Figure 12:
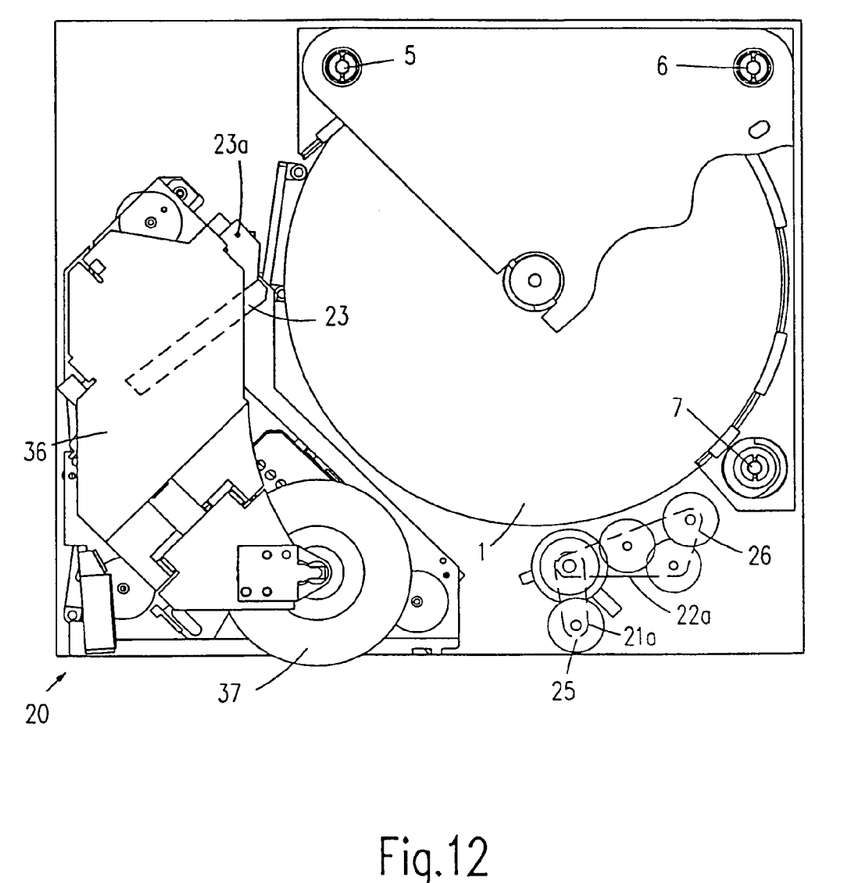
FIG. 12 is a plan view of the changer apparatus with an information disc in the loading position.
Figure 13:
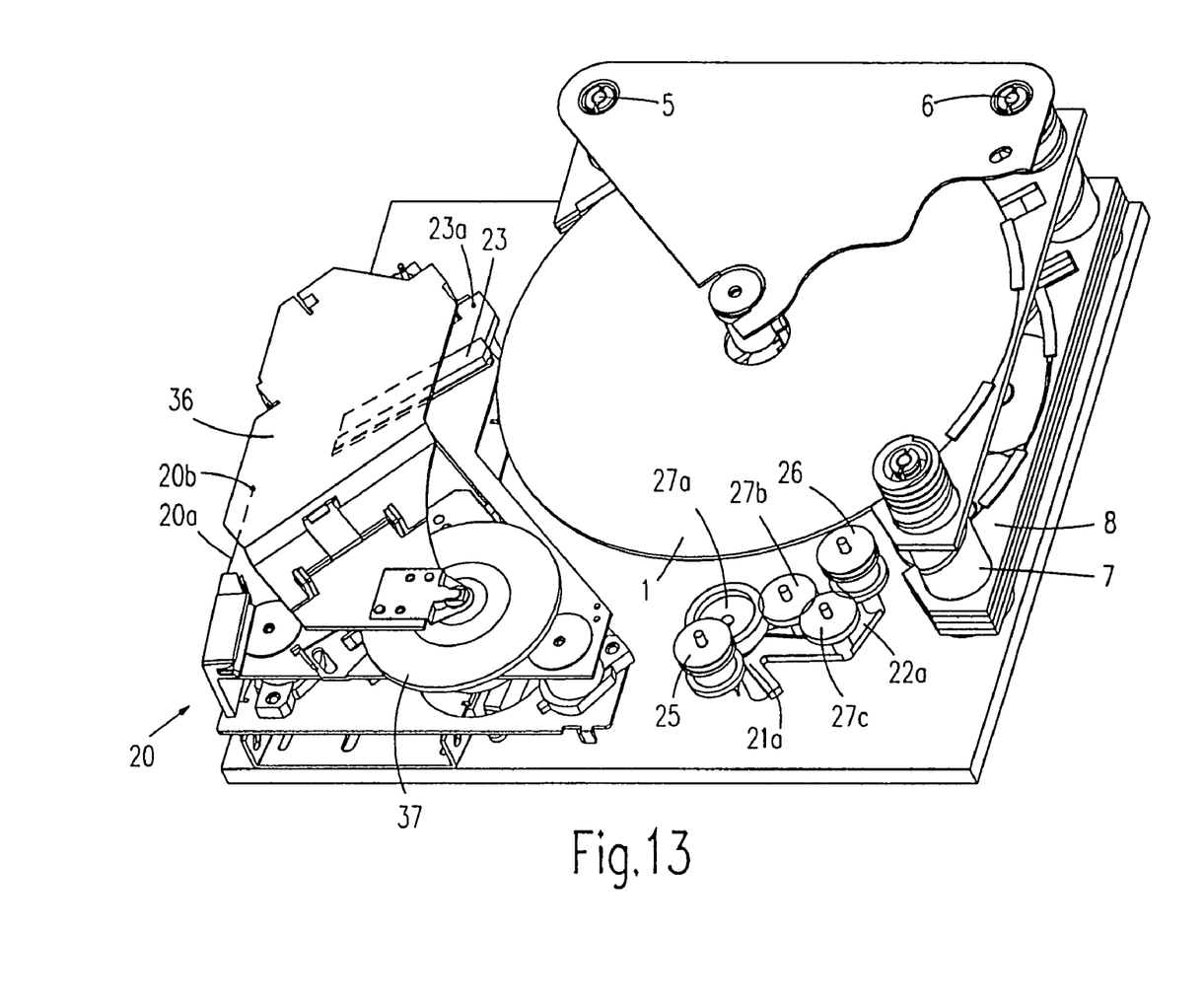
FIG. 13 shows the changer apparatus of FIG. 12 in a perspective view with an information disc in the loading position.

FIGS. 12 and 13 show the changer apparatus with the information disc 1 in the loading position shown in FIG. 2, FIG. 12 being a plan view and FIG. 13 being a perspective view. The second transport wheel 26 has been pivoted out of the stacking unit 4, so that now the information disc 1 together with the first holder compartment 8, in accordance with FIG. 2, can be moved from this loading position 16 shown in FIGS. 12 and 13 into one of the four upper stacking positions 13a, 13b, 13c or 13d by rotation of the threaded spindles 5, 6 and 7. Conversely, the information disc 1 can be moved from the loading position shown in FIG. 13 into the first intermediate position in that the second transport wheel 26 is pivoted against the disc edge 1a and the second transport wheel 26 is rotated in the opposite direction and subsequently into the eject position in that the first transport wheel 25 is driven.

In the situation shown in FIGS. 12 and 13 the read unit 30 has been moved completely out of the range of operation of the stacking unit 4.

The invention claimed is:

1. A changer apparatus for information discs, comprising:
a stacking unit for stacking at least two information discs in respective stacking positions;
a read/write unit for reading information stored on the information discs and/or writing information on the information discs in a play position;
an eject position at which an information disc can be removed from the apparatus; and
transport means for transporting the information discs from the eject position into a loading position along a curve-shaped loading path, the loading position being a position for loading discs from the loading path of the transport means into the stacking positions of the stacking unit;
and in which the play position is along the loading path between the eject position and the loading position.

2. The apparatus of claim 1, wherein the play position is offset from a direct connecting line between the loading position and the eject position.

3. The apparatus of claim 1, wherein the play position is disposed on the loading path.

4. The transport means of claim 1, including a first transport mechanism for transporting the information discs between the eject position, the play position and the loading position, and a second transport mechanism for transport of the information discs from the loading position into the stacking positions of the stacking unit, the first transport mechanism moves the information discs in the loading plane and the second transport mechanism moves the information discs in a stacking direction oriented vertically with respect to the loading plane.

5. The apparatus of claim 4, wherein the first transport mechanism includes at least a first and a second guide for the disc edge of the information disc, the first guide includes a groove for supporting the disc moving along the loading path and the first guide is movable in the loading plane, the second guide includes at least one rotationally drivable first transport wheel for driving the disc to move along the loading path.

6. The apparatus of claim 5, wherein:
the first guide is a passive supporting guide;
the first transport mechanism further includes: a third guide for the disc edge and having a second transport wheel for driving the disc to move along the loading path; and a passive supporting guide as a fourth guide for the disc edge with a groove for supporting the disc moving along the loading path;
the first, the second, the third and the fourth guides include one or more pivotal arms which are supported at one end and which are pivotable in the loading plane;
the first, the second, the third and the fourth guides are pre-loaded towards the curve-shaped loading path;
the first transport wheel moves the information discs between the eject position and a transfer position and the second transport wheel moves the information discs from the transfer position into the loading position.

7. The apparatus of claim 6, wherein the first and the third guide are mounted on a common pivot.

8. The apparatus of claim 1, wherein a read/write unit is movably supported on a chassis plate of the apparatus.

9. The apparatus of claim 8, wherein the read/write unit includes a base plate and a laser mounting plate, the base plate and the laser mounting plate are coupled by means of dampers, the base plate is slidably mounted on the chassis plate, and the laser mounting plate carries an optical unit for reading information stored on the information disc and a clamping device for clamping the information disc in the play position so that the read unit is isolated from vibrations of the chassis.

10. The apparatus of claim 8, wherein the read/write unit is movable into the play position in the vertical direction.

11. The apparatus of claim 8, wherein in the play position the first, second, third and fourth guides are pivoted away from the disc edge of the information disc, and the pivoting away of the guides is controlled by the base plate of the read write unit or a sliding plate.

12. The apparatus of claim 1, wherein
the stacking unit comprises at least two holder compartments for holding one information disc each;
the holder compartments are coupled to at least one threaded spindle and are movable into a vertical direction by rotation of the spindles;
there is provided an upper stacking zone and a lower stacking zone in the stacking unit for stacking the holder compartments;
the loading position is in a central zone between the upper and the lower stacking zone;
one of the holder compartments is each time movable into the loading position by rotation of the spindles, and the transport means move the information disc from the holder compartment, which is in the loading position, into the play position and into the eject position.

13. The apparatus of claim 12, wherein in the axial direction of the spindles the central zone has spacing zones at both sides of the loading position, which spacing zones define an axial spacing between the holder compartment in its loading position and the axially adjacent holder compartments in their stacking positions.

14. The apparatus of claim 12, wherein the average screw thread pitch of the spindles in the loading position is smaller than the average screw thread pitch in the upper and the lower stacking zone.

15. The apparatus of claim 12, wherein the screw thread pitch of the spindles in the loading position is essentially zero.

16. The apparatus of claim 12, wherein the average screw thread pitch in the spacing zones is greater than the average screw thread pitch in the upper and the lower stacking zone.

17. The apparatus of claim 12, wherein there is provided a lower and an upper guide pin for guiding the information discs into the holder compartments of the stacking unit, which guide pins are engageable into the center holes of the information discs from above and from below, respectively.

18. The apparatus of claim 1 in which the overall depth of the apparatus is less than or equal to approximately 1.5 times the information disc diameter.

19. A changer apparatus for information discs, comprising:
a stacking unit for stacking at least two information discs in different respective stacking positions;
a read/write unit for reading information stored on the information discs and/or writing information on the information discs in a play position;
an eject position at which an information disc can be inserted and removed from the apparatus; and
transport means for transporting the information discs from the eject position into a loading position along a curve-shaped loading path, the loading position being a position for loading discs from the loading path of the transport means into the stacking positions of the stacking unit;
and in which the discs can be immediately transported from the eject position to the play position without going through the loading position.

* * * * *